United States Patent [19]

Nakai

[11] 4,262,912
[45] Apr. 21, 1981

[54] PHONOGRAPH TONE ARM CONTROL DEVICE

[76] Inventor: Gary T. Nakai, 5515 Cromwell La., Oak Forrest, Ill. 60452

[21] Appl. No.: 89,275

[22] Filed: Oct. 29, 1979

[51] Int. Cl.³ ............................................. G11B 17/06
[52] U.S. Cl. .................................... 369/41; 369/216; 369/221
[58] Field of Search .................... 274/13 R, 14, 15 R, 274/23 R

[56] References Cited

U.S. PATENT DOCUMENTS

| 2,047,733 | 7/1936 | Harrison | 274/13 R |
|---|---|---|---|
| 3,870,320 | 3/1975 | Torrington | 274/9 RA |
| 3,910,584 | 10/1975 | Hilton | 274/14 |
| 4,049,279 | 9/1977 | Kleis | 274/15 R |
| 4,121,834 | 10/1978 | Yestrebi | 274/23 R |
| 4,148,492 | 4/1979 | Bachelet | 274/15 R |

FOREIGN PATENT DOCUMENTS 1331594 9/1973 United Kingdom ................ 274/23 R

*Primary Examiner*—John W. Shepperd
*Attorney, Agent, or Firm*—Gary, Juettner & Pyle

[57] ABSTRACT

A device for selectively and automatically moving a phonograph tone arm vertically or horizontally includes a horizontally disposed endless belt which supports the tone arm and transports it in a horizontal direction. The endless belt is raised or lowered by a cam mechanism. Separate reversible, battery powered, direct current motors actuate the endless belt and the cam mechanism. A control box between the power source and the motors includes four push buttons to actuate the motors to move the arm up, down, in or out. The device is intended primarily as a separately purchased accessory to a phonograph or record player.

8 Claims, 7 Drawing Figures

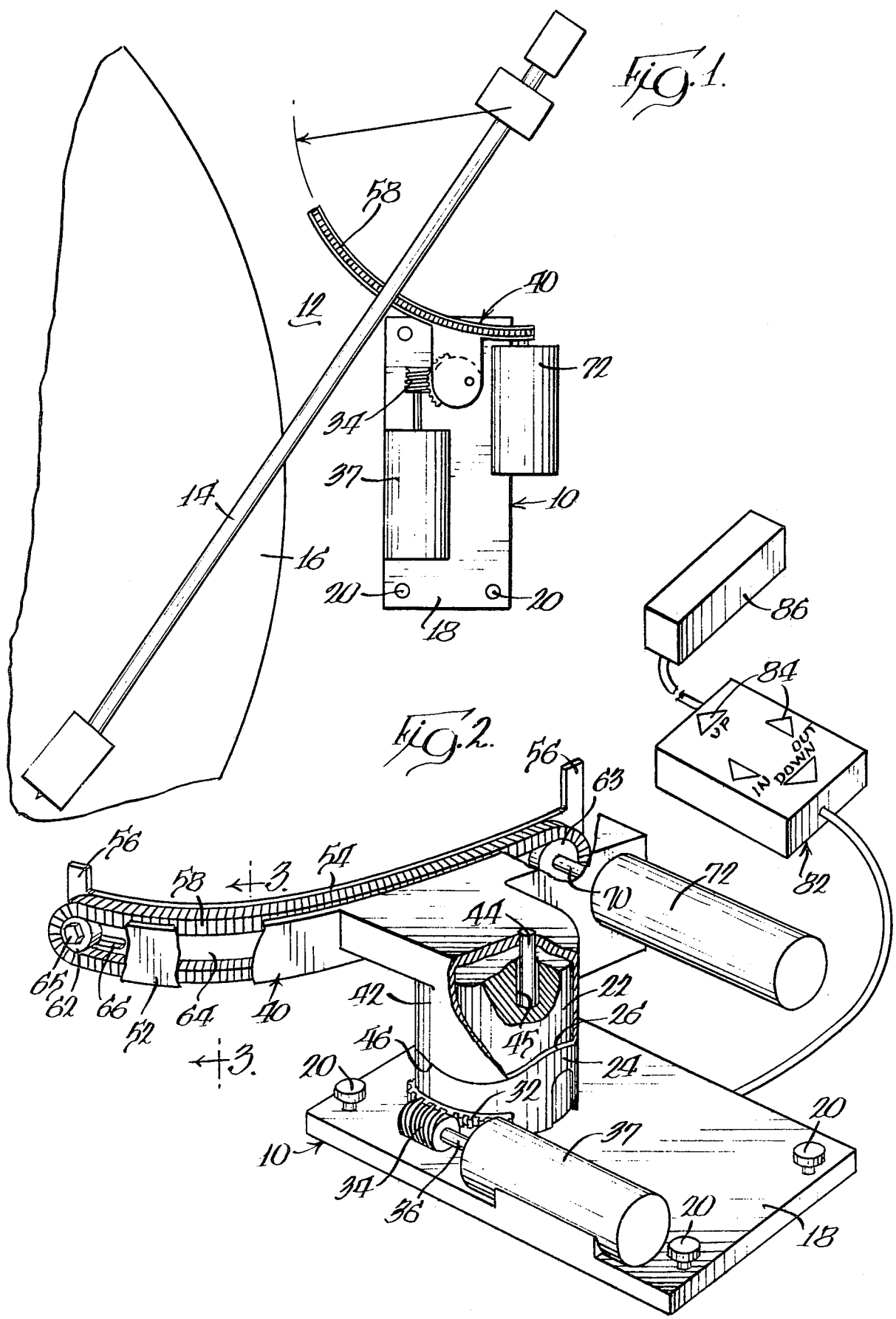

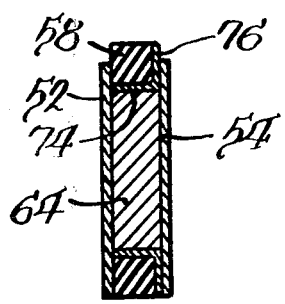
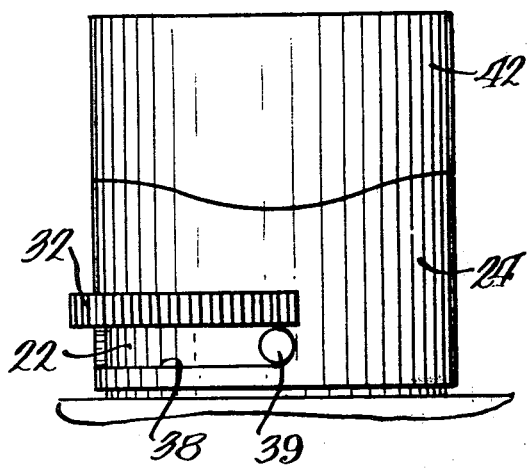
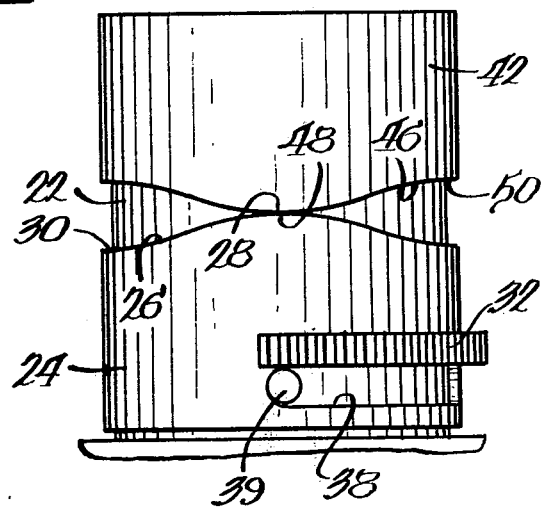
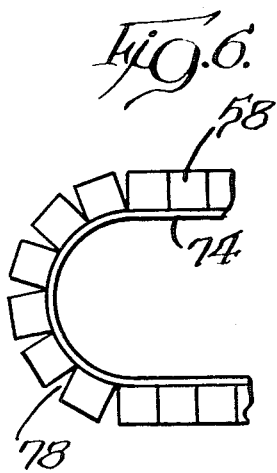
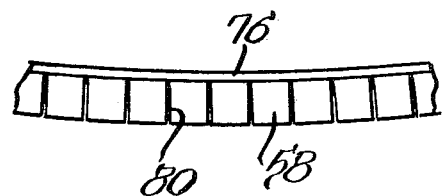

PHONOGRAPH TONE ARM CONTROL DEVICE

BACKGROUND OF THE INVENTION

Existing controls for the tone arm of the home audiophile's record player generally are manually operated and generally are restricted to raising or lowering the tone arm. Indexing of the tone arm in a horizontal direction is either completely manual, or limited to prescribed positions above the record as in the case of an "automatic turntable". Such prior art controls are inherently inaccurate and damage can result if the tone arm is mishandled or dropped onto the playing surface of a record. Raising and lowering as well as indexing by hand subjects the delicate stylus assembly of the phonograph cartridge, the tone arm itself, and the record to needless abuse.

SUMMARY OF THE INVENTION

A primary object of the present invention is the provision of an auxiliary control adaptable to virtually any record player and which affords complete and accurate control of all movements associated with the positioning of a tone arm onto or off of the playing surface of a phonograph record without physically handling the tone arm.

A further object is the provision of a tone arm motion control which prevents over-stressing of the stylus assembly when the tone arm is lowered onto the record playing surface, which assures that the tone arm cannot be dropped onto the record to damage the stylus assembly and/or the record grooves, and which conveys no sudden forces to the tone arm or turntable suspension upon actuation.

The foregoing objects are accomplished by utilization of a flexible, horizontally disposed, endless belt to support the tone arm and to transport it to its "rest" or "off" position or to any desired position above an associated phonograph record. Controlled positive vertical motion is provided by mating cam surfaces. A push button control panel permits complete operation of the device without manually touching the tone arm or any other part of the turn table. The actuating mechanism, the control panel and a power source are self contained and adaptable to most existing phonographs.

BRIEF DESCRIPTION OF THE DRAWINGS

FIG. 1 is a schematic plan view of the preferred embodiment of the invention as associated with the tone arm and the record-carrying platter of a phonograph turntable;

FIG. 2 is a perspective view, with portions cut away for clarity, of the tone arm control device of FIG. 1, disassociated from tone arm and turntable;

FIG. 3 is an enlarged cross-sectional view taken substantially along line 3—3 of FIG. 2;

FIG. 4 is a fragmentary view of a cam mechanism for raising or lowering the tone arm support, the mechanism being shown in lowered position;

FIG. 5 is a fragmentary view of the cam mechanism of FIG. 4 in raised position;

FIG. 6 is a fragmentary elevational view of one end of the continuous belt for transporting the tone arm; and FIG. 7 is a fragmentary plan view of the continuous belt shown in FIG. 6.

DESCRIPTION OF THE PREFERRED EMBODIMENT

Referring first to FIG. 1, the tone arm positioning device, designated generally by the numeral 10, is shown as it would be positioned on the top surface 12 of a phonograph turntable or record player and in working relationship with a tone arm 14 and record-carrying platter 16.

The device comprises a base 18 which is positioned and leveled on surface 12 by four adjustable leveling screws 20 whereby the device may be adapted to almost any record player surface. Fixed to base 18 is a cylindrical support column 22 (FIG. 2). Mounted for rotation on the lower portion of column 22 is a collar 24 having its upper edge 26 in the form of a cam surface with a pair of opposed peaks 28 and a pair of opposed valleys 30 (FIGS. 4 and 5). A gear wheel portion 32 is secured to the collar and has a length corresponding to approximately 100° of the circumference thereof.

Mating with gear wheel portion 32 is a worm gear 34 mounted on the output shaft 36 of worm drive motor 37, which is a precision, miniature, permanent magnet, reversible direct current motor with an integral speed reduction gear box. The motor is conventional and is powered by a 1.5 volt dry cell through a conventional solid state current limiting control for a purpose to be described hereinafter. Motor 37 preferably will draw about 20 milliamps at 1.5 volts and is geared to provide an output speed of about 250 RPM in either direction.

As seen in FIGS. 4 and 5, collar 24 is provided with a slot 38 approximately coextensive with gear wheel portion 32, the ends of the slot being engageable with a stop pin 39 projecting from support column 22. The pin and slot effectively limit rotation of the collar to 90° of movement, thereby transporting the positions of peaks 28 and valleys 30.

Mounted on the support column above the collar is a belt support assembly indicated generally at 40. The belt support includes a cylindrical mounting portion 42 slidably receivable on the support column as best seen in FIG. 2. Means is provided for accommodating vertical motion of the belt support assembly while restraining rotational motion, this means comprising a pin 44, preferably press-fit in mounting portion 42 above the support column 22, and eccentrically of the vertical axis thereof and extending downwardly therefrom to be slidably received in cylindrical hole 45 in the support column 22.

The lower edge 46 of mounting portion 42 is in the form of a cam surface having a pair of opposed peaks 48 and a pair of opposed valleys 50, these peaks and valleys, in one rotational position of collar 24, mating as shown in FIG. 4 with respective valleys and peaks of the cam surface 26. When the collar 24 is rotated through 90° by motor 37, the peaks 28 and 48 move into alignment, as seen in FIG. 5, whereby the entire belt support assembly is raised, preferably to a maximum distance of about ⅛ of an inch.

The belt support assembly also comprises an outer belt guide 52 and an inner belt guide 54, the guides being arcuate and lying in a horizontal plane. A pair of stops 56 extend upwardly from opposite ends of inner belt guide 54. Positioned between and constrained to follow the arcuate path of belt guides 52 and 54 is an endless belt 58 supported at one end by an idler pulley 62 and at the other end by a drive pulley 63. A belt flight support 64, shown in FIGS. 2 and 3, may be formed integrally with belt guide 54 or may be formed as a separate part and secured to belt guide 54 as by bolting, spot welding, or in any other convenient manner. In any event, belt flight support 64 extends between the upper and lower flights of belt 58 so that the belt is supported against vertical deflection.

As seen in FIG. 2, the idler pulley is rotatably mounted on a shouldered mounting bolt and nut assembly 65 which is adjustable by means of adjustment slot 66 in the guides and flight support. Desired tension in the endless belt is thus easily maintained.

The drive pulley 63, which is preferably rubber coated for increased friction, is secured to, for rotation with, output shaft 70 of drive pulley motor 72. The motor 72 is a conventional precision, miniature, permanent magnet, reversible direct current motor with an integral speed reduction gear box. The current draw of motor 72 is about 30 milliamps at 1.5 volts and the final output speed through the integral gear box is approximately 12.78 RPM in either direction.

The endless belt 58, seen best in FIGS. 3, 6 and 7, is made from a soft, flexible rubber or rubber-like material such as neoprene and is provided on its radially inner periphery and also on one side face with backing material 74 and 76. The backing material 74 and 76 is fabric such as silk, nylon, polyester, or the like, having comparatively low frictional qualities to reduce the inherent drag associated with the belt sliding along a three dimensional track, and preferably is of knit construction so as to be able to flex in two directions.

In order to accommodate the bending motion of the belt both around the pulleys and along the arcuate path defined by the belt guides, the belt is provided along its entire length with relief cuts, as seen in FIGS. 6 and 7, in the belt faces opposite the fabric backing 74 and 76. The overall effect of the relief cuts and the fabric backing is to minimize the power requirements of motor 72. It should be noted that the fabric backing may be applied to the belt after the relief cuts are made, in which case the knit construction of the backing will accommodate the necessary stretching. Alternately, the backing may be bonded to the belt and the relief cuts then made in both the belt and backing. In the latter case, the backing need not be a knit type because its stretching requirements will not exist.

The belt preferably has a maximum width of approximately 0.10 inches and a maximum depth of approximately 0.125 inches. It will be noted that the overall height of the belt positioning device is approximately one inch so that it is readily adaptable to fit beneath virtually all turntable tone arms.

For ease of operation, the device is controlled by means of a separate push button control panel 82 having individual push buttons 84 for each required direction of motion, namely, "IN", "OUT", "UP" and "DOWN". A separate power source 86 containing a 1.5 volt dry cell, is preferably mounted in any out-of-the-way but accessible place.

It is intended that the device described herein will be used primarily as an accessory to existing record players. Assembly of the device to such record players is shown essentially in FIG. 1. The device is positioned so that the center of curvature of the arc of the belt is coincident with the pivot center of the tone arm 14. The device is the leveled by means of leveling screws 20 and may be held in position by double-sided adhesive tape or by a temporary adhesive such as rubber cement, either of which will be applied to the bottom ends of screws 20. Either method of fastening will accommodate easy removal of the device if the need arises.

FIG. 4 shows the relationship of the cam surfaces 26 and 46 in the lowermost position of the belt support 40, such that the endless belt would be out of contact with the tone arm as during the playing of a phonograph record. In this position, the mating surfaces 26 and 46 are coincident.

It it is now desired to "cue up" the tone arm, the "UP" button 84 is depressed to actuate motor 37 to rotate, through worm gear 34 and gear wheel portion 32, collar 24 through an arc of 90 as determined by stop pin 39. In the event the button is held depressed, after the motion of the collar is stopped by pin 39, damage to the motor is prevented by the built-in current limiting control which limits the current allowed to pass through the motor when it is stalled.

As the collar 24 rotates as described above, the mating surfaces gradually become displaced until, after 90° of rotation, the position shown in FIG. 5 is reached at which time the tone arm will have been lifted off of the record by contact with the endless belt 58, the upward motion of cylindrical mounting portion 42.

The tone arm may now be indexed to the "stowed" or "off" position or to a position above any groove on the record. This is accomplished by depressing either the "IN" or "OUT" push button 84, energizing motor 72. The endless belt will now move in the selected direction at a preferred speed of about 12.5 inches per minute, carrying with it the tone arm until the depressed push button is released or until the tone arm contacts either of the stops 56. At this time the tone arm will have been positioned above the record playing surface over the selected cut or groove on the record, or else in the stowed position. The tone arm may now be lowered or "cued down" by depressing "DOWN" push button 84 to energize motor 37 to return collar 24 to its original rotational position. During this period of rotation, the belt support will be lowered by gravity until the position shown in FIG. 4 is achieved. The lowering rate is controlled by the rotational speed of collar 24. As the assembly is lowered, the endless belt will lose contact with the tone arm when the stylus touches the record, thereby freeing the movement of the tone arm to follow the grooves of the record.

It is seen, therefore, that the disclosed tone arm positioning device affords simple, accurate, control for raising, lowering, or indexing a tone arm, without physically handling the tone arm and without any danger of damaging the tone arm, stylus assembly or any other portions of the record player, and without jarring the turntable suspension upon actuation. The device is of a size to be readily adaptable to virtually any commercial phonograph or turntable system.

I claim:

1. A device for positioning the tone arm of a phonograph, the tone arm being pivotal in both vertical and horizontal direction, said device comprising: an endless belt for supporting and transporting said tone arm; a belt guide to hold said belt on an arcuate path, the center of arc being coincident with the pivotal center of the tone arm; first motor means for driving said endless belt; cam means adapted for raising and lowering said endless belt; second motor means for actuating said cam means; and control means for selectively driving said motor means in either direction independently of each other.

2. A device according to claim 1, wherein said belt is formed of soft, flexible rubber, a flexible fabric backing strip is secured to a radially inner surface and to one side face of said belt, said belt being provided with relief cuts in the faces opposite the backing strips so as to facilitate flexing of the belt in two directions.

3. A device according to claim 1, and including vertically extending stops to limit horizontal movement of the tone arm.

4. A device according to claim 1, wherein said cam means comprises a stationary support column, a belt support slidably mounted on said support column for vertical motion only, a collar rotatably mounted on said support column below said belt support, said collar and said belt support having mutually engageable cam surfaces for moving said belt support in a vertical direction responsive to rotational movement of said collar.

5. A device for positioning the tone arm of a phonograph selectively in vertical or horizontal direction about a common pivot point, said device comprising: a base, a cylindrical support column fixed to the base; a collar rotatably mounted on the lower portion of said base, the upper edge of said collar defining a cam surface having a pair of opposed peaks and a pair of opposed valleys; a gear wheel portion mounted on said collar and extending for at least 90° of the circumference of the collar; a reversible worm drive motor having an output shaft, a worm secured to said output shaft for rotation therewith and engageable with said gear wheel portion; a belt support slidably mounted on said column, the lower edge of said belt support defining a cam surface having a pair of opposed peaks and a pair of opposed valleys mating with the peaks and valleys of the collar cam surface; means accommodating vertical sliding motion of said belt support on said column while preventing rotational motion of said belt support; a reversible belt-drive motor mounted on said belt support and having an output shaft; a drive pulley mounted on said shaft for rotation therewith; a horizontally disposed endless belt, having an upper and a lower flight, supported at one end by said drive pulley and at the other end by an idler pulley; a belt guide confining said belt to an arcuate path the center of which is coincident with the pivot point of the tone arm; means secured to said guide and extending between said upper and lower flights to afford support for said belt in a vertical direction; and control means for selectively actuating said worm drive motor to rotate said collar and move the peaks of said cam surfaces into or out of alignments so as to raise or lower the belt support, belt and tone arm, and for selectively actuating said belt-drive motor to move said belt along its arcuate path whereby said tone arm may be indexed to any desired position.

6. A device according to claim 5, wherein said accommodating means comprises a pin eccentrically mounted in said belt support and extending downwardly thereof, said pin being received in a cylindrical hole in said support column to accommodate only vertical movement of said belt support.

7. A device according to claim 5, wherein the surfaces defining the inner periphery and one side face of said flexible belt are provided with a fabric backing having a lower coefficient of friction than said belt.

8. A device according to claim 7, wherein said flexible belt is provided, along its entire length, with relief cuts in the faces opposite said backing to facilitate flexing of said belt in two directions.

* * * * *